May 28, 1957 — C. C. CARPI — 2,793,576
FLUID OPERATED CULTIVATOR
Filed Oct. 13, 1953 — 5 Sheets-Sheet 1

INVENTOR.
Colin C. Carpi,
BY Paul & Paul
ATTORNEYS.

May 28, 1957 C. C. CARPI 2,793,576
FLUID OPERATED CULTIVATOR
Filed Oct. 13, 1953 5 Sheets-Sheet 2

INVENTOR.
Colin C. Carpi,
BY Paul & Paul
ATTORNEYS.

May 28, 1957 C. C. CARPI 2,793,576
FLUID OPERATED CULTIVATOR
Filed Oct. 13, 1953 5 Sheets-Sheet 3

INVENTOR.
Colin C. Carpi,
BY Paul & Paul
ATTORNEYS.

May 28, 1957

C. C. CARPI 2,793,576

FLUID OPERATED CULTIVATOR

Filed Oct. 13, 1953

INVENTOR.
Colin C. Carpi,
BY Paul & Paul
ATTORNEYS.

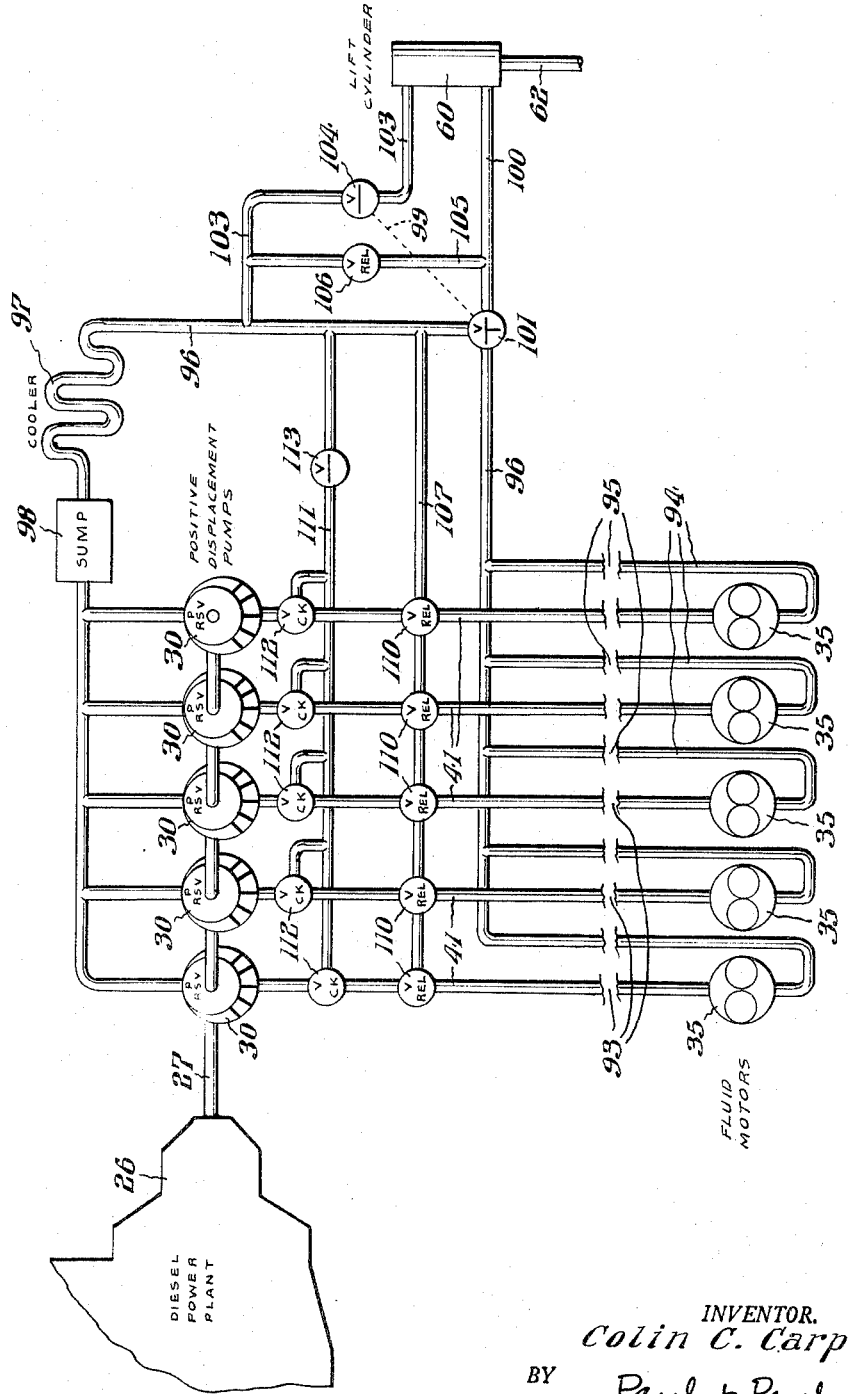

United States Patent Office 2,793,576
Patented May 28, 1957

2,793,576

FLUID OPERATED CULTIVATOR

Colin C. Carpi, Narberth, Pa.

Application October 13, 1953, Serial No. 385,736

6 Claims. (Cl. 97—40)

This invention relates to an apparatus for cultivating soils. It is an object of the invention to provide an economical soil cultivator characterized by its positive and efficient operation. Another object of this invention is to provide a soil cultivator which is free of the usual heavy and bulky mechanical mechanisms often found on conventional cultivators. Still another object is to provide a cultivator which requires relatively little maintenance as compared with conventional cultivators. Still another object of this invention is to provide a soil cultivator so constructed that plowing, disking, harrowing, fertilizing and planting, or any group of these, may be combined into a single operation. Another object is to provide soil cultivating mechanism combined with a fertilizing apparatus in such manner that the fertilizer is applied to the soil and then mixed with the soil.

Still another object of this invention is to provide a soil cultivating mechanism having capacity to cultivate or furrow soil in the neighborhood of crops which have not attained a height of more than about eighteen inches.

Still another object of this invention is to provide a cultivator capable of cutting a wide swath at relatively high speed in proportion to the area covered. Still another object is to provide a cultivator mechanism having a simple and easy operating control means.

Another object of this invention is to provide a hydraulic cultivating apparatus wherein safety means are provided for protecting the working elements of the mechanism against damage while in use. Other objects and advantages of this invention, including the simplicity and economy of the same and the ease with which the cultivator mechanism may be combined with other agricultural devices, will appear in further detail hereinafter and in the drawings whereof:

Fig. 4 represents an enlarged sectional view of a cultivator device comprising a specific embodiment of this invention, this view being taken as indicated by the lines and arrows IV—IV which appear in Fig. 2;

Fig. 7 represents a diagrammatic illustration of the hydraulic connections in accordance with one embodiment of this invention wherein a single positive displacement pump is connected to drive a plurality of fluid motors; and Fig. 8 represents a diagrammatic view similar to Fig. 7 wherein a plurality of separate fluid pumps are provided, each pump being connected to drive a separate fluid motor.

Figure 1:
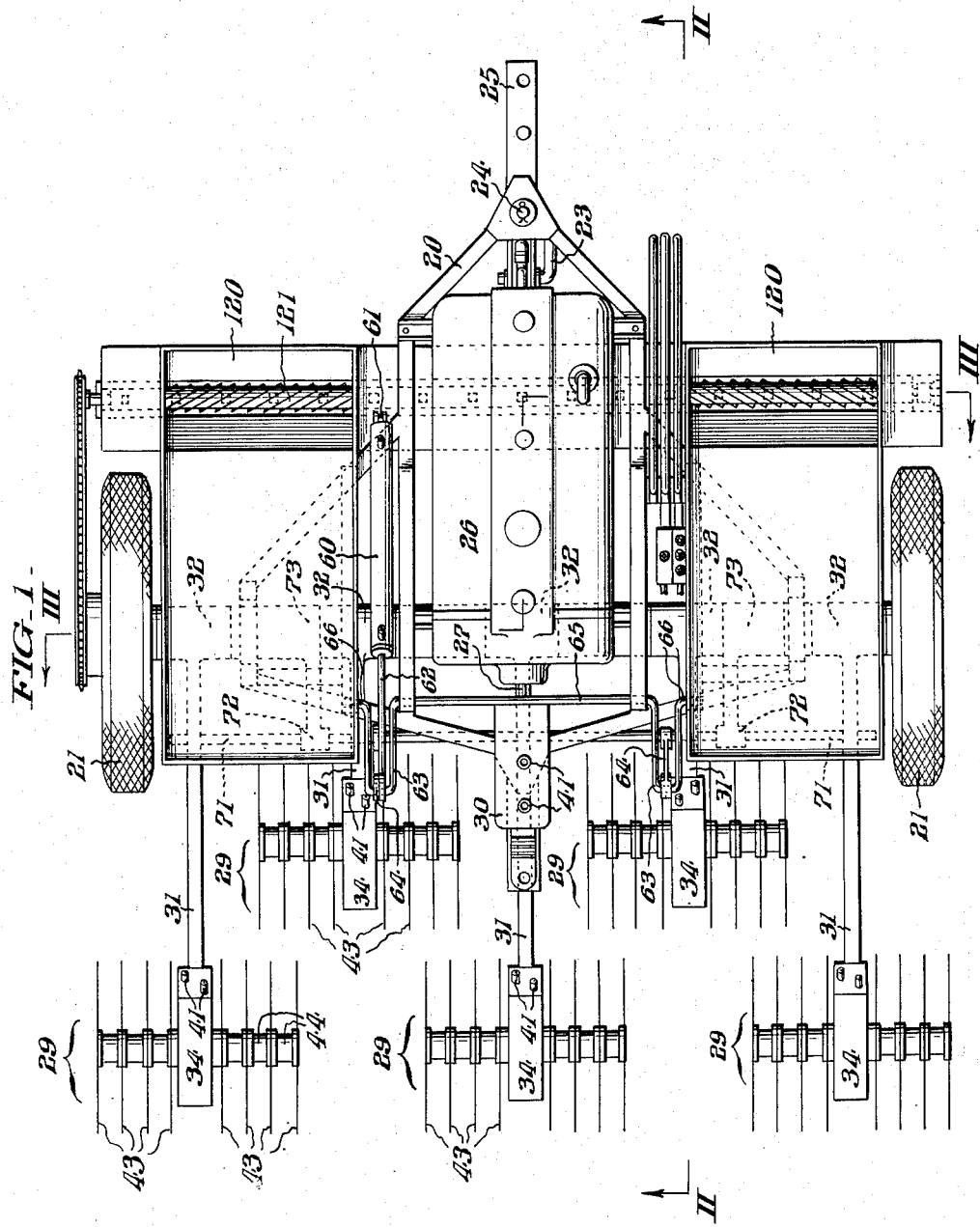
Fig. 1 represents a plan view of a hydraulic cultivator mechanism embodying features of this invention.

Turning now to the specific embodiments of the invention selected for illustration in the drawings, the number 20 designates a chassis mounted on two rear wheels 21 and a single forward wheel 22. Wheel 22 is rotatably carried on the end of a bent shaft 23 rotatably connected at 24 to chassis 20. The forward end of the chassis carries a yoke 25 whereby the chassis may be attached to a tractor, for example.

The chassis 20 carries an engine 26 having an output shaft 27 mechanically coupled to a hydraulic pump 30. The hydraulic pump supplies fluid under pressure to the cultivator mechanisms, as will further appear.

The cultivator mechanisms comprehensively designated 29 are spaced rearwardly of the chassis 20 by carriage bars 31 which are pivotally attached by sleeves 32 to the transverse axle 33 of the chassis. Each carriage bar 31, together with its associated cultivator mechanism, is free to swing up and down about the axle 33.

Each cultivator mechanism 29 comprises a housing 34 fixed to the end of carriage bar 31 containing a fluid motor 35, a worm 36 driven by fluid motor 35, and a gear 37 fixed to a central sleeve 40 and driven from the worm. Flexible tubes 41 are connected to each fluid motor leading from the hydraulic pump 30, thereby providing hydraulic power means for rotating the sleeve 40. Fixed to opposite ends of the sleeve 40 (see particularly Fig. 4) are a plurality of cultivator tines 43 which extend outwardly from the axis of sleeve 40. The tines 43 are secured in position by hubs 44 and screws 45 which penetrate through the tines and are threaded into sleeve 40. Successive sets of hubs and tines may be added in the same manner, four sets being shown in Fig. 4, for example.

In section, the tines have inner flat portions 50 which extend substantially perpendicular to the axis of sleeve 40, a short, deeply curved outwardly concave portion 51 and a longer, more gradually curved outer portion 52. Although the tines shown in Fig. 4 are highly preferred, others may be used.

Means are provided for raising and lowering the cultivator mechanisms toward and away from the earth. A hydraulic lifting device in the form of a cylinder 60 is pivotally attached to an upstanding ear 61 on the chassis 20. A piston rod 62, longitudinally reciprocable relative to cylinder 60, is pivoted at its end to a yoke 63 to which is also pivoted a lifting rod 64. At the opposite side of the machine (see particularly Fig. 1) another yoke 63 is provided, having another lifting rod 64. The yokes 63, 63 are rigidly connected together by a central rod 65. At their free ends the yokes 63, 63 are bent outwardly forming posts 66, 66 each of which extends through a slot 67 in a side plate 70 supported on the chassis 20.

At their bottom ends the lifting rods 64 are provided with eyes through which a transverse rod 71 extends. Rod 71 is directly below all of the rearwardly extending carriage bars 31 on which the cultivators 29 are mounted. When rod 71 moves upwardly, all the cultivators 29 are moved upwardly. The transverse rod 71 is rotatable in sleeves 72 on arms 73 which are pivoted to the axle 33.

Figure 2:
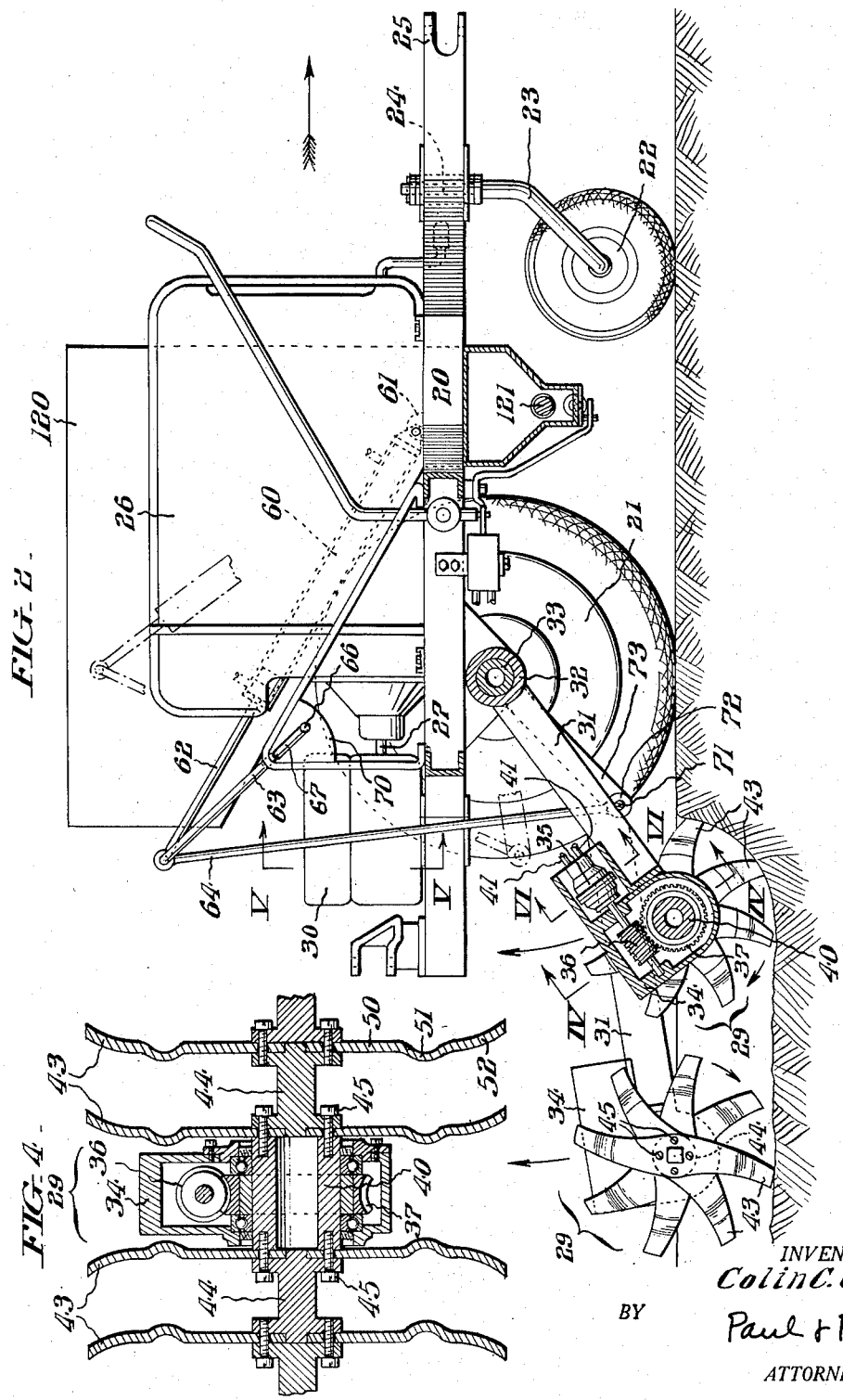
Figs. 2 and 3 represent sectional views taken as indicated by the lines and arrows II—II and III—III which appear in Fig. 1.
Figure 3:
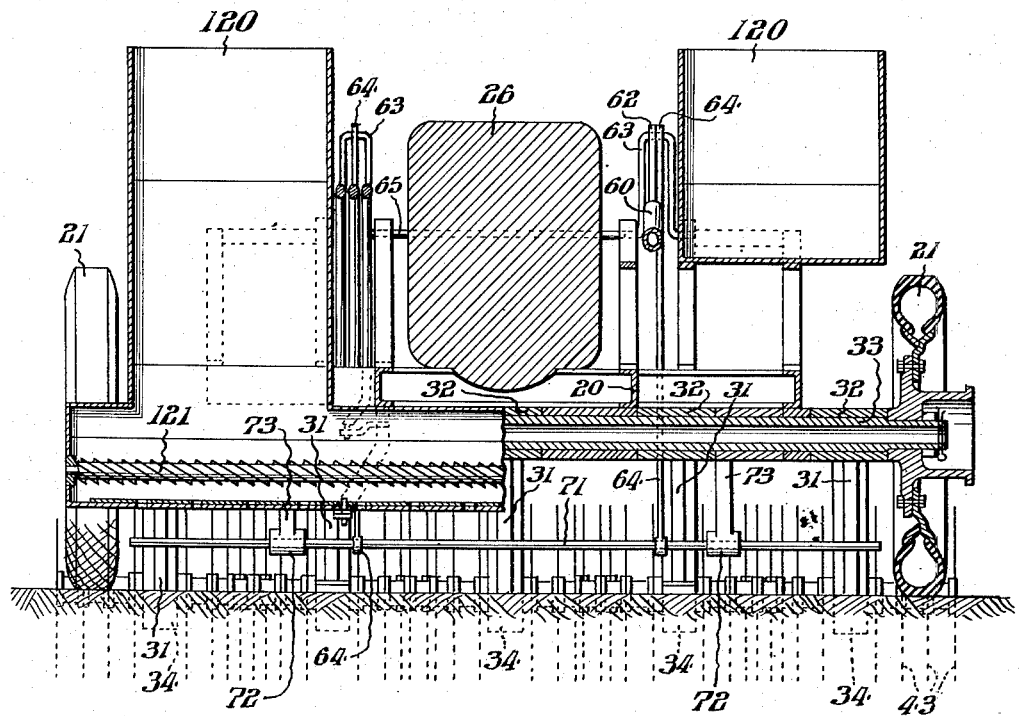

Accordingly it will be appreciated that, when the piston rod 62 is forced into the cylinder 60, the yokes 63 move downwardly in the slots 67, bearing against the lower ends of slots 67. Further movement of piston rod 62, in the same direction, causes the cylinder 60 and rod 62 to pivot upwardly about its connection to ear 61, thereby lifting the rods 64 and 71, swinging all the carriage bars 31 and cultivator mechanisms 29 concurrently upwardly out of the earth. The dot-dash lines in Fig. 2 illustrate the upper limit of such movement, which is limited by yokes 63 which slide upwardly against the upper ends of slots 67, preventing any further movement upwardly.

Figure 5:
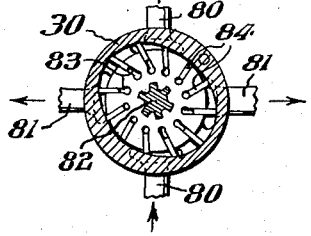
Figs. 5 and 6 represent diagrammatic sectional views showing a fluid pump and a fluid motor, respectively, which comprise components of the fluid operated cultivator shown in the preceding figures.

The hydraulic pump 30 may be a vane pump, as illustrated in Fig. 5. Fluid enters the inlets 80 and is positively driven out of the outlets 81 by mechanical rotation of the rotor 82, which is caused by engine 26. Rotor 82 has a large number of angled slots 83 in which slidable vanes 84 are fitted. Means are provided (which may be the pressurized fluid) for forcing the vanes outwardly away from the center of the rotor along their slots. The inside of the pump housing 30 is substantially elliptical, while the rotor is circular, and the fluid in the intervening space is positively displaced and pumped by the vanes. It will be appreciated, of course, that other hydraulic pumps may be utilized in accordance with this invention.

Figure 6:
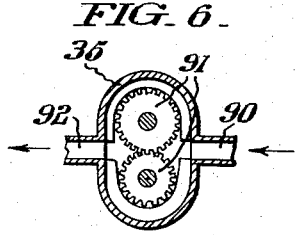

The fluid motors 35 may be gear motors, as illustrated in Fig. 6. Fluid pumped by pump 30 enters inlet 90, flows around the outside peripheries of gears 91 and out the outlet 92, thereby positively rotating the gears. Other fluid motors may, of course, be substituted.

Turning now to Fig. 8 of the drawings, the engine 20 drives five separate positive displacement pumps 30, each of which is connected to a separate fluid motor 35 through a flexible tube 41 and a breakaway coupling 93. Return lines 94 are connected through breakaway couplings 95 into a return header 96 which returns the hydraulic fluid through a cooler 97 and sump 98 to the inlets of the pumps 30.

The lift cylinder 60 has an inlet 100 connected into the return header 96 through a three-way valve 101. The fluid exhaust from cylinder 60 flows through an outlet 103 and a valve 104 back to the return header 96. Valves 101, 104 are coupled together as indicated schematically at 99, whereby one valve is closed when the other is open. A relief line 105 having a relief valve 106 extends between the inlet 100 and outlet 103.

A pressure relief header 107 extends across the tubes 41, having separate pressure relief valves 110 which are set to open when excessive pressure is developed. Header 107 is connected to the return header 96. A by-pass line 111 is similarly connected across the tubes 41, through individual check valves 112. By-pass line 111 is connected through a valve 113 to the return header 96. Valve 113 controls the operation of the motor means independently of the movement of the carriage along the path.

The fluid flow diagram of Fig. 7 is generally similar to Fig. 8, and a description of similar features is not repeated. A single pump 30 is connected to an inlet header 114. The tubes 41 are connected through flow control valves 115 into the header.

It will be appreciated that various other devices may be incorporated into the structure on the chassis 20. For example, the drawings show fertilizer bins 120 together with a distributing screw 121, which may be automatically operated in conjunction with the tillers to fertilize and then to break up the soil causing the soil and fertilizer to be mixed. Moreover, a plurality of vehicles may be linked together to perform a variety of other functions in the desired order.

It will further be appreciated that the device may be modified in a variety of other ways. For example, equivalent mechanisms may be substituted for those shown in the drawings provided they function in a similar manner to accomplish a similar result, parts may be reversed, and certain features of the invention may be used independently of other features, all within the spirit and scope of the invention as defined in the appended claims.

Having thus described the invention, I claim:

1. A hydraulic cultivator comprising a wheeled chassis adapted to travel along the earth, a hydraulic pump, a carriage pivotally connected to the chassis, a hydraulic fluid motor carried by the carriage, a tiller driven from the hydraulic motor, a hydraulic lifting device for lifting the carriage, flexible hydraulic connecting linkages between the pump and motor for driving the tiller, a return conductor extending from the motor outlet to said pump, a fluid inlet conductor extending from the return line to the hydraulic lifting device, and valve means operable from the carriage to close off the fluid return to the pump and to open the conductor leading into the lifting device, whereby the carriage is positively and quickly lifted above the earth.

2. The hydraulic cultivator defined in claim 1, further characterized by the fact that a supplemental fluid connection extends from said inlet conductor to said return line, said supplemental conductor having a pressure relief valve therein.

3. A hydraulic cultivator comprising a wheeled chassis adapted to travel along the earth, a hydraulic pump, a carriage pivotally connected to the chassis, a hydraulic fluid motor carried by the carriage, a tiller driven from the hydraulic motor, a hydraulic lifting device for lifting the carriage, flexible hydraulic connecting linkages between the pump and motor for driving the tiller, a return conductor extending from the motor outlets to said pump, a fluid inlet conductor extending from the return line to the hydraulic lifting device, valve means operable from the carriage to close off the fluid return to the pump and to open the conductor leading into the lifting device, whereby the carriage is positively and quickly lifted above the earth, said lifting device including a hydraulic cylinder pivotally mounted on said chassis, a lifting member extending downwardly from the cylinder below said carriage, limit means for limiting the movement of said lifting member, and a transverse member below said carriage, said transverse member being connected to said lifting member and bearing against the bottom of said carriage to lift the same.

4. The hydraulic cultivator defined in claim 3, wherein the limit means includes a yoke member connected to said lifting member, and a slotted plate in which a portion of the yoke member travels.

5. A hydraulic cultivator comprising a wheeled self-powered chassis movable along the surface of the earth, a hydraulic pump carried on said chassis, a carriage connected to and rearwardly of the chassis and arranged to be pulled thereby, a plurality of rotary tillers carried by the carriage with capacity for swinging movement up and down from and toward the earth, said tillers being separately and independently movable up and down, fluid motor means each carried by one of said tillers and each connected to a rotary tiller to drive the same independently of the movement of said carriage along the earth, flexible hydraulic conducting means connected to said pump and to each of said motor means, flexible fluid return means extending from said fluid motor means to said pump, each of said tillers being mounted for rotation about a substantially horizontal axis and consisting of a plurality of spaced-apart tines, and flow control means connected to said hydraulic conducting means and to said motor means for regulating the operation of said motor means independently of the speed of movement of the carriage along the earth.

6. The hydraulic cultivator defined in claim 5, wherein such chassis carries a plurality of said hydraulic pumps, and wherein a plurality of flexible hydraulic conducting means are provided, each of said hydraulic pumps being connected by one of said hydraulic conducting means to a corresponding one of said fluid motor means.

References Cited in the file of this patent

UNITED STATES PATENTS

| | | |
|---|---|---|
| 1,525,262 | Austin | Feb. 3, 1925 |
| 2,109,393 | Le Bleu | Feb. 22, 1938 |
| 2,601,752 | Rose | July 1, 1952 |
| 2,609,650 | Lindquist | Sept. 9, 1952 |
| 2,616,348 | Ariens | Nov. 4, 1952 |
| 2,657,620 | Meeks | Nov. 3, 1953 |
| 2,665,621 | Smith et al. | Jan. 12, 1954 |
| 2,691,927 | Denton | Oct. 19, 1954 |
| 2,718,836 | Pertics et al. | Sept. 27, 1955 |

FOREIGN PATENTS

| | | |
|---|---|---|
| 570,755 | Great Britain | July 20, 1945 |